March 29, 1960
W. E. GEORGE
2,930,242
CRAWLING ATTACHMENT
Filed May 19, 1958
4 Sheets-Sheet 1
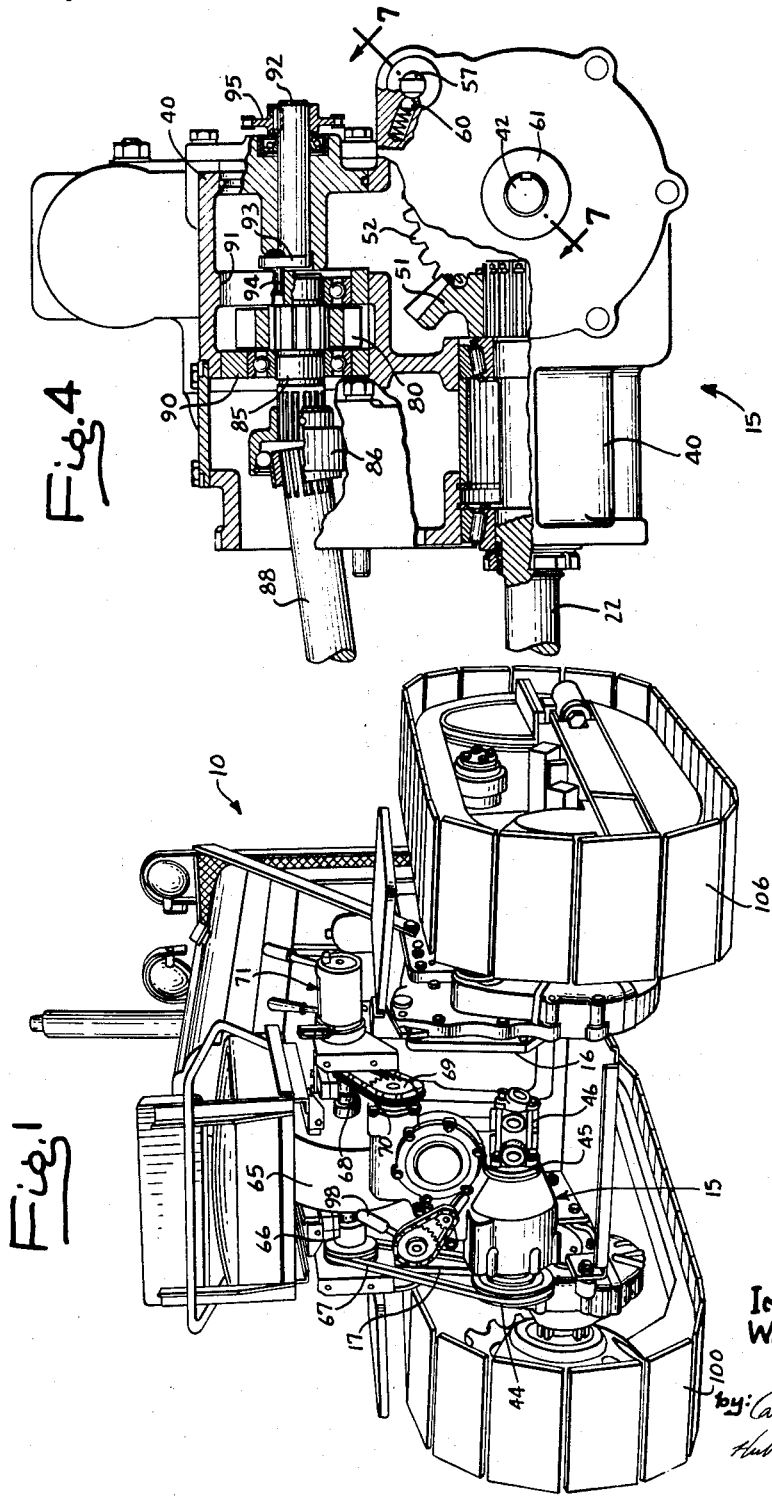
INVENTOR
WARREN E.
GEORGE
by Carlson, Pitzner,
Hubbard & Wolfe
ATTYS

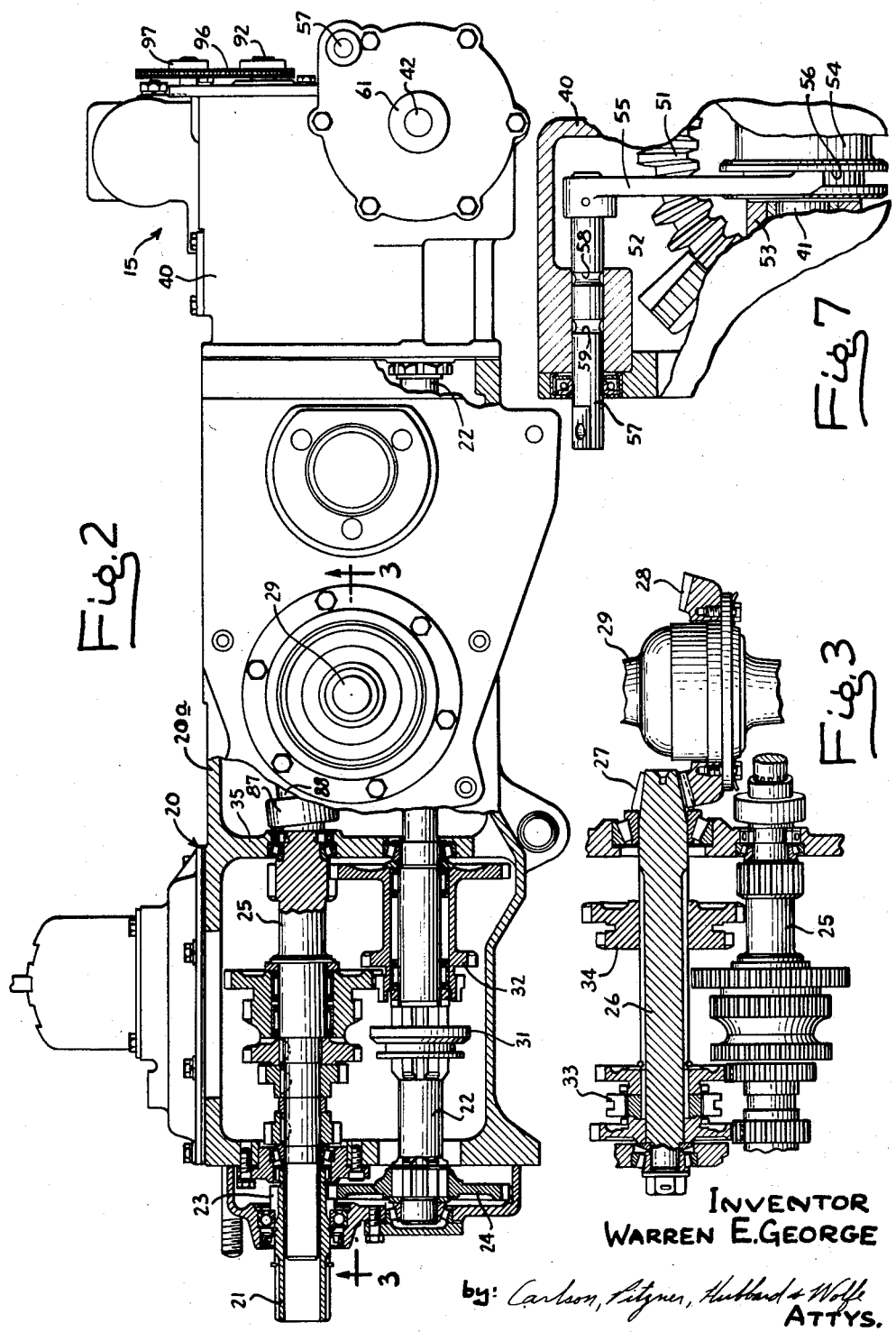

March 29, 1960 W. E. GEORGE 2,930,242
CRAWLING ATTACHMENT
Filed May 19, 1958 4 Sheets-Sheet 3

INVENTOR
WARREN E. GEORGE
by: Carlson, Pitzner, Hubbard & Wolfe
ATTYS

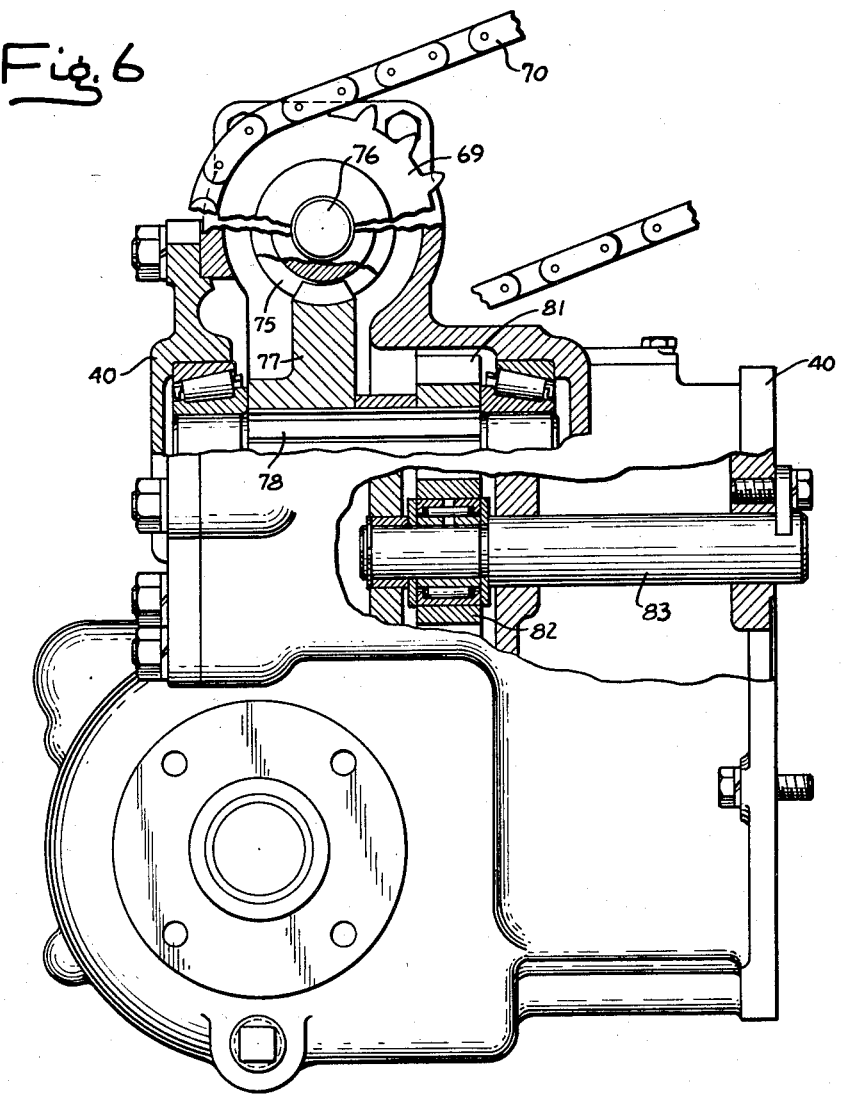

United States Patent Office 2,930,242
Patented Mar. 29, 1960

2,930,242

CRAWLING ATTACHMENT

Warren E. George, Auburn, Nebr., assignor to Auburn Machine Works, Inc., Auburn, Nebr., a corporation of Nebraska Application May 19, 1958, Serial No. 736,065

4 Claims. (Cl. 74—15.2)

The present invention relates generally to drive mechanisms for trench digging machines and more particularly to a transmission attachment permitting a standard tractor to operate effectively as a trenching machine.

When adapting a vehicle for operation as a trencher, the vehicle drive mechanism must be capable of delivering power at moderate r.p.m. to the trench digging mechanism, and to simultaneously drive the vehicle at a slow, forceful crawl. It is also preferable that the crawling speed be controllable without affecting the operation of the digging mechanism, since digging conditions vary considerably and the speed of the trencher must be adjusted accordingly.

While conventional tractors do have transmissions providing auxiliary power-take-offs, or "PTO's," which could be utilized to drive a digging mechanism, these transmissions do not provide the required crawling speed ranges. In order to modify a conventional tractor for trenching operations it has been proposed to take power from the normal tractor PTO for not only driving the digging mechanism but for providing a crawling drive, with an auxiliary speed reduction unit being used between the PTO and the driving train and with the regular transmission input being disconnected.

It is the primary aim of the invention to provide a novel and improved attachment for adapting a standard vehicle transmission for trencher operation by enabling the PTO to drive the transmission power input shaft at reduced speed in addition to driving the digging mechanism.

It is a more specific object of the invention to provide an attachment as described above particularly intended for adapting a three shaft type of transmission without altering or disturbing the power plant, clutch or transmission and without requiring special access through an opening in the wall of the transmission housing. It is a related object to provide an attachment of this type that mounts compactly and unobtrusively on the rear of the vehicle body behind the transmission as an integral extension of the tractor drive mechanism.

It is a further object to provide an attachment of the above character permitting a speed controlling transmission, such as a fluid-type torque converter, to be interposed between the PTO power source and the speed reduction unit supplying power for advancing the vehicle so that the crawling speed can be varied to correspond with digging conditions.

It is another object to provide an attachment of the type described above permitting the power train driving the vehicle at a crawling speed to be easily broken under load so that the vehicle may be stopped, and reversed, even though driven solidly against an obstruction.

It is also an object to provide an attachment for accomplishing the above objectives which also permits normal operation of the vehicle and its transmission, including the provision of a normal PTO output at the rear of the vehicle.

Other objects and advantages of the invention will become apparent upon reading the attached detailed description and upon reference to the drawings in which:

Figure 1 is a perspective view of a tractor on which the crawling attachment of the present invention has been installed.

Fig. 2 is an elevation, partially in section, of the transmission embodied in the tractor shown in Fig. 1 and showing the mounting of the crawling attachment.

Fig. 3 is a fragmentary sectional view taken along the line 3—3 of Fig. 2.

Fig. 4 is an elevation, partially in section, of the left side of the crawling attachment shown in Fig. 2.

Fig. 6 is an elevation, partially in section, of the right side of the crawling attachment shown in Fig. 2.

Fig. 7 is a fragmentary sectional view taken along the line 7—7 in Fig. 4.

Figure 5:
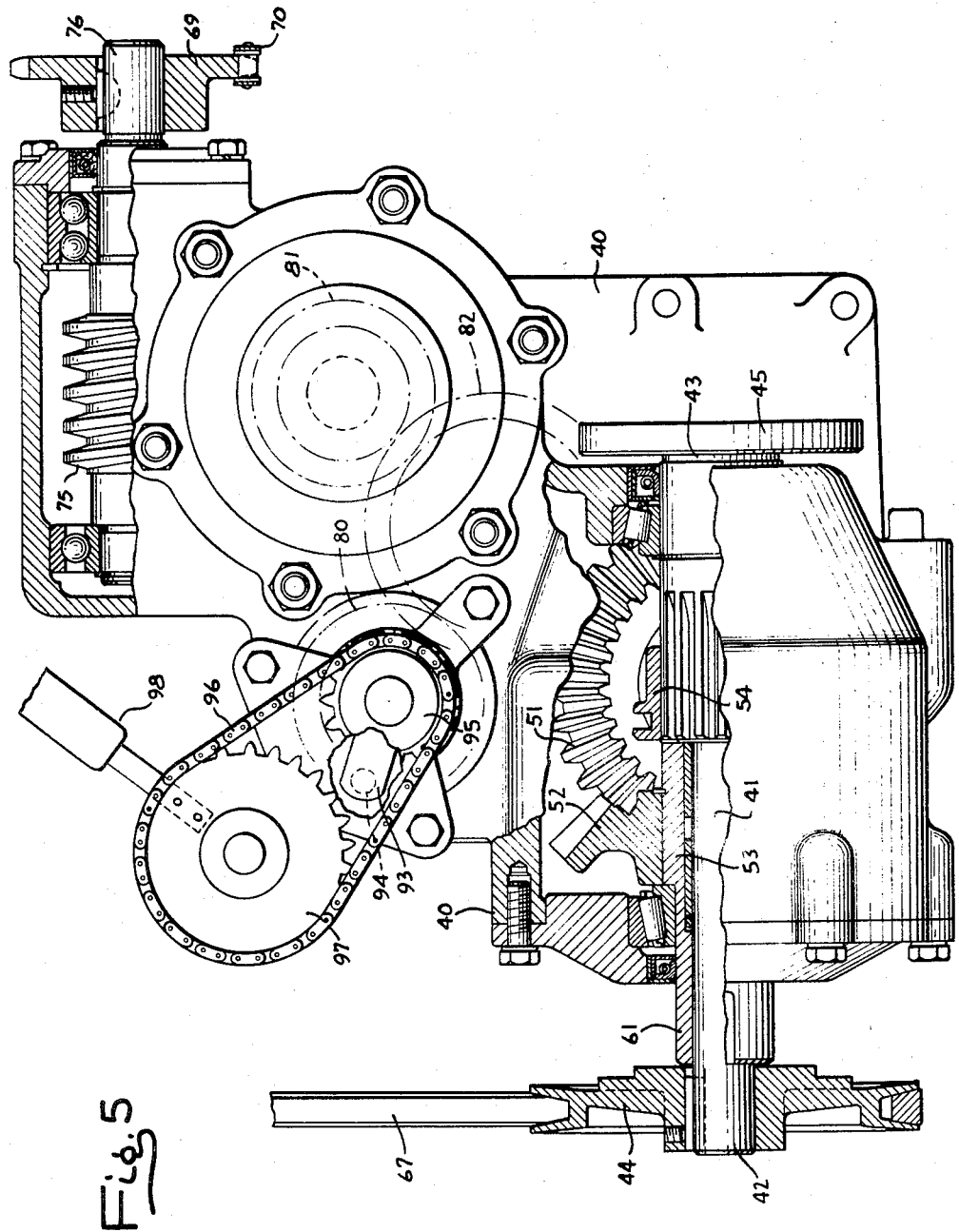
Fig. 5 is a rear elevation, partially in section, of the crawling attachment shown in Fig. 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to Fig. 1, there is shown a tractor 10 having mounted thereon a crawling attachment 15 constructed in accordance with the present invention. The tractor 10 is provided with a pair of spaced rear mounting plates 16 and 17 adapted to receive a digging mechanism of the type shown in applicant's co-pending application, Serial No. 447,588, filed August 3, 1954, now patent No. 2,842,873. For present purposes it will be sufficient to note that such a digging mechanism comprises a digging ladder which supports an endless chain carrying digging teeth. The digging ladder is pivoted at the rear of the tractor 10 on the plates 16, 17 so that the digging mechanism can be swung into contact with the ground, whereupon the teeth, driven by the chain, will be effective to dig a trench behind the tractor as it moves forwardly at a slow crawling speed.

The tractor 10 is provided with a transmission 20 (see Fig. 2) that is driven by a power input sleeve 21 which is selectively coupled to the tractor engine through a conventional friction clutch (not shown). The clutch is preferably operated by a foot pedal in the well known manner.

The transmission 20 is a positive drive, multiple speed unit which includes three parallel shafts journalled in a case 20a. One shaft is a PTO shaft 22 that is directly coupled to the power input sleeve by means of a pinion 23 on the sleeve 21 and a gear 24 splined on the shaft 22. The PTO shaft 22 is thus constantly driven whenever the clutch is engaged to drive the sleeve 21.

The other two of the three parallel transmission shafts are the transmission input shaft 25, and the transmission output shaft 26 (see Fig. 3). The transmission output shaft 26 ends immediately behind the transmission case wall 35 and carries a bevel gear 27 which is in meshing engagement with a second bevel gear 28 secured to an axle drive shaft 29. The drive shaft extends laterally from each side of the transmission 20 and is coupled to the ground engaging members of the tractor 10, which in the present case, are the tracks 100, 106, Fig. 1.

In order to operate the transmission conventionally, a shiftable collar 31, splined to the PTO shaft 22, is moved to the right in Fig. 2 so as to couple a compound gear 32 to the shaft 22. This establishes a drive from the tractor engine to the transmission input shaft 25, and by manipulating shiftable elements 33 and 34, a desired gear ratio between the driven sleeve 21 and the axle drive shaft 29 can be established in the manner well known to those skilled in the art.

In accordance with the present invention, the crawling attachment 15 is mounted in alignment with the rear end of the transmission 20 and selectively couples the powered PTO shaft 22 both to a digging mechanism (not shown), and to the transmission input shaft 25 through a speed reduction unit, so as to simultaneously power the digging mechanism and drive the tractor at crawling speeds. In the present embodiment, the attachment 15 includes a housing 40 adapted to form a continuation of the transmission case 20a. Journalled transversely in the housing 40 is a stub or cross shaft 41 having end portions 42, 43 extending from the opposite sides of the housing. On the extending end portion 42 of the cross shaft 41 is mounted a pulley 44 for a purpose which will be made plain below. On the extended end portion 43 of the cross shaft is secured a flange plate 45 which is adapted to drive the digging mechanism when the latter is mounted on the tractor 10. In the illustrated embodiment as seen in Fig. 1, a universal coupling unit 46 is bolted directly to the flange plate 45 so as to provide a flexible, direct drive between the cross shaft 41 and the digging chain of the digging mechanism.

In order to selectively power the cross shaft 41, a bevel gear 51 is splined on the end of the PTO shaft 22 (see Fig. 4), and this gear is in meshing engagement with a second bevel gear 52 which is splined on a sleeve 53 that is rotatably carried by the cross shaft 41 (see Fig. 5). Splined to the cross shaft 41 is a shiftable collar 54 which may be moved to the left in Fig. 5 so as to engage the splined portion of the sleeve 53. It will be observed, therefore, that the PTO shaft 22 constantly rotates the sleeve 53 through the gears 51, 52, and the shiftable collar 54 provides a positive clutch which may be operated to couple the sleeve 53 to the cross shaft 41.

In order to shift the collar 54 and thus selectively drive the cross shaft 41, a shifter fork 55 is provided which engages an annular groove 56 formed in the collar. The shifter fork 55 is carired by an actuating rod 57 which extends through the attachment case 40 and may be manipulated manually, or through a suitable linkage (not shown) by the tractor operator. Preferably, the rod 57 is provided with a pair of annular grooves 58, 59 which cooperate with a spring loaded detent 60 (see Fig. 4) so as to establish "clutch engaged" and "clutch disengaged" positions for the actuating rod 57.

To provide a conventionally useable PTO power source, the sleeve 53 is provided with an end portion 61 which extends outwardly of the attachment housing 40. A pulley or sprocket may be mounted on the sleeve portion 61 so as to be constantly driven by the PTO shaft 22 without regard to the position of the collar 54.

For the purpose of coupling the PTO shaft 22 and the transmission input shaft 25 while providing an accurate control of the speed at which the shaft 25 is driven, the input of a hydraulic torque converter 65 is coupled to the cross shaft 41, and the output of the torque converter is transmitted to the transmission input shaft 25 (see Fig. 1). Preferably, the pulley 44 on the cross shaft 41 drives an input shaft 66 of the torque converter 65 through a belt 67, and an output shaft 68 on the torque converter drives a sprocket 69 journalled on the attachment 15 through a chain 70. The torque converter 65 is of a standard type and provides an infinitely variable driving ratio between the input shaft 66 and the output shaft 68. A control assembly 71 is provided to adjust this speed ratio in accordance with the digging conditions encountered. For purposes of the present invention, the converter 65 simply represents a speed controlling device coupling the pulley 44 and the sprocket 69 of the crawling attachment 15.

In order to produce a slow speed, powerful drive for crawling speed operation, the attachment 15 includes a speed reduction unit interposed between the sprocket 69 and the transmission input shaft 25. In the illustrated embodiment, this unit takes the form of a worm 75 which is carried on a shaft 76 to which the sprocket 69 is keyed. The worm 75 is in meshing engagement with a worm gear 77 (see Fig. 6) carried by a splined shaft 78. The shaft 78 is journalled in the housing 40 on an axis parallel to the transmission input shaft 25.

For the purpose of permitting the interruption of the tractor drive even under heavy loads, a pinion 80 is flexibly coupled to the transmission input shaft 25 and arranged for radial shifting movement into and out of meshing engagement with a gear train that includes the worm gear 77. Forming the gear train between pinion 80 and the worm gear 77, is a gear 81 splined on the shaft 78 and an intermediate gear 82 rotatably carried on a shaft 83 next to the housing 40 (see Fig. 6). The intermediate gear 82 engages both the gear 81 and the pinion 80 (see Fig. 5).

To flexibly couple the pinion 80 to the transmission input shaft 25 so that it may be moved radially into and out of engagement with the intermedite gear 82, the pinion 80 is splined to a shaft 85 that is coupled to the transmission input shaft through a pair of universal joints 86, 87 and an intermediate shaft 88 (see Figs. 2 and 4). The flexible coupling afforded by the universal joints 86, 87 not only permits the pinion 80 to be shifted in a radial direction but also allows the closely spaced shafts 22 and 25 to be coupled by the attachment 15.

In order to shift the pinion 80 radially out of meshing engagement with the intermediate gear 82, the shaft 85 on which the pinion is carried is journalled in an eccentric sleeve 90 that is rotatably fitted in a cylindrical recess 91 formed in the housing 40. It may be seen that by rotating the eccentric sleeve 90, the pinion 80 is moved radially relative to the intermediate gear 82. The parts are so proportioned and adjusted that when the sleeve 90 rotates 180 degrees, the gears 80, 82 move between fully separated and fully meshed positions.

In order to rotate the eccentric sleeve 90 and thus interrupt the drive to the transmission input shaft 25, an operating shaft 92 is provided having a crank 93 fixed to its inner end which is secured to the sleeve by a pin 94. The shaft 92 is journalled in the housing 40 on an axis passing through the center of the sleeve 90, and it can therefore be seen by rotating the shaft, the pinion 80 may be moved into and out of engagement with the intermediate gear 82.

For rotating the shaft 92, a sprocket 95 is keyed to the outer end of the shaft and is coupled by means of a chain 96 to a larger sprocket 97 carrying a handle 98. The sizes of the sprocket 95, 97 are selected so that the handle 98 need be moved through an arc of only approximately 90 degrees in order to rotate the sprocket 95, and thus the shaft 92, through 180 degrees and thereby move the shiftable pinion 80 between its disengaged and fully meshed positions.

To briefly recount the operation of the crawling attachment 15, it will be recalled that in the transmission 20 the PTO shaft 22 is driven by the tractor engine through the powered sleeve 21. Thus, the beveled gears 51, 52 are effective to constantly rotate the sleeve 53 and this sleeve provides an end portion 61 which may be utilized as a conventional PTO output. When the transmission is to be used conventionally, the collar 31 is shifted into engagement with the compound gear 32 of a normal gear arrangement within the transmission.

When it is desired to operate the tractor 10 at crawling speeds for a trenching operation, the collar 31 is shifted to the left in Fig. 2 so as to disengage the transmission gears from the powered PTO shaft 22. The collar 54 is then shifted to the left in Fig. 5 by manipulating the rod 57, whereupon the constantly driven sleeve 53 is positively coupled to the cross shaft 41. Rotation of the cross shaft drives, through flange 45, the digging mechanism which is mounted on the mounting plates 16, 17 at the rear of the tractor 10.

Rotation of the cross shaft 41 also drives, through the pulley 44 and the belt 67, the input shaft 66 of the fluid torque converter 65. The output shaft 68 of the torque converter powers the worm 75 through chain 70 and sprocket 69, and the worm is in constant engagement with the worm gear 77. The worm and worm gear provide a low r.p.m. at high torque drive for the tractor.

Coupling the worm gear 77 to the transmission input shaft 25 is a gear train including gears 81, 82 and the shiftable pinion 80. The pinion 80 is coupled to the input shaft 25 through the universal joints 86, 87 and the intermediate shaft 88.

It can thus be seen that rotation of the cross shaft 41 in the crawling attachment not only drives the digging mechanism but also provides power through a speed control unit, such as the converter 65, to the transmission input shaft 25.

Should the tractor, during its trenching operation, be inadvertently stalled when the digging mechanism is drawn against an underground obstruction, the power train to the tractor transmission can be interrupted even though the parts may be "jammed" together by this condition. To accomplish this, it is merely necessary for the operator to swing the lever 98, which results in the pinion 80 being moved out of mesh with the intermediate gear 82. Since the gears separate in a radial direction, they can be easily disengaged even though they may be tightly locked together. Once the driving train is broken by radially shifting the pinion 80, the jamming forces throughout the gear train will be relieved and the tractor can be easily reversed and backed up so that the obstruction can be cleared from the digging mechanism.

To adapt the tractor for normal use, the lever 98 is swung so as to disengage the pinion 80 and the collar 31 is shifted to engage the gear 32.

It will be observed that the crawling attachment 15 is quite compact and mounts unobstrusively at the rear of the tractor without requiring alteration of the engine mounting or repositioning of the transmission 20 and its associated driving train. The attachment may be easily installed by being simply bolted at the rear of the transmission case 20a. Thus, a conventional tractor can be quickly and inexpensively made suitable for trenching operations by utilizing the present invention.

I claim as my invention:

1. A crawling attachment for a transmission having both a powered PTO shaft and a transmission input shaft extending from the same end of the transmission, the attachment comprising, in combination, a housing adapted for mounting in alignment with said end of the transmission, a stub shaft journalled in said housing and coupled to said PTO shaft, said stub shaft having end portions extending oppositely from the sides of said housing, means on one of said stub shaft end portions for coupling the shaft to a mechanism, a drive gear journalled in said housing on an axis parallel to said transmission input shaft, means including a speed controlling transmission coupling said drive gear to said other one of said stub shaft end portions, and a pinion gear flexibly coupled to said input shaft and mounted in said housing for radial shifting movement into and out of meshing engagement with a gear train including said drive gear, the attachment thus permitting the powered PTO shaft to positively drive said mechanism and simultaneously power the transmission at controllable crawling speeds.

2. A crawling attachment for a transmission having both a powered PTO shaft and a transmission input shaft extending from the same end of the transmission, the attachment comprising, in combination, a housing adapted for mounting in alignment with said end of the transmission, a bevel gear journalled in said housing and coupled to said PTO shaft, a cross shaft journalled in said housing transversely to said PTO shaft and having end portions extending oppositely from the sides of said housing, means including a positive clutch for selectively coupling said bevel gear to said cross shaft, means on one of said cross shaft end portions for coupling the shaft to a mechanism, a worm journalled transversely in said housing, means including a speed controlling transmission coupling said worm to said other one of said cross shaft end portions, a worm gear in meshing engagement with said worm and being journalled in said housing on an axis parallel to said transmission input shaft, and a pinion gear flexibly coupled to said input shaft and mounted in said housing for radial shifting movement into and out of meshing engagement with a gear train including said worm gear, the attachment thus permitting the powered PTO shaft to positively drive said mechanism and simultaneously power the transmission at controllable crawling speeds.

3. A crawling attachment for a transmission having both a powered PTO shaft and a transmission input shaft extending from the same end of the transmission, the attachment comprising, in combination, a housing adapted for mounting in alignment with said end of the transmission, a cross shaft journalled in said housing transversely of said PTO shaft and having end portions extending oppositely from the sides of said housing, a sleeve on said cross shaft coupled to said PTO shaft, said sleeve extending from one side of said housing and providing a conventionally usable PTO power source, a positive clutch selectively coupling said sleeve to said cross shaft, means on one of said cross shaft end portions for coupling the shaft to a mechanism, a worm journalled transversely in said housing and being coupled to said other one of said cross shaft end portions, a worm gear in meshing engagement with said worm and being coupled to said input shaft for rotation therewith, the attachment thus permitting the powered PTO shaft to drive the mechanism, drive an auxiliary mechanism as a normal PTO unit, and selectively power the transmission at crawling speeds.

4. A crawling attachment for a transmission having both a powered PTO shaft and a transmission input shaft extending from the same end of the transmission, the attachment comprising, in combination, a housing adapted for mounting in alignment with said end of the transmission, a bevel gear journalled in said housing and coupled to said PTO shaft, a cross shaft journalled in said housing transversely of said PTO shaft and having end portions extending oppositely from the sides of said housing, a sleeve on said cross shaft carrying a second bevel gear in meshing engagement with said first mentioned bevel gear, said sleeve extending from one side of said housing and providing a conventionally usable PTO power source, a positive clutch selectively coupling said sleeve and its bevel gear to said cross shaft, means on one of said cross shaft end portions for coupling the shaft to a mechanism, a worm journalled transversely in said housing, means including a speed controlling transmission coupling said worm to said other one of said cross shaft end portions, a worm gear in meshing engagement with said worm and being journalled in said housing on an axis parallel to said transmission input shaft, a pinion gear flexibly coupled to said input shaft for rotation therewith, an eccentric sleeve journaling said pinion gear and arranged for shifting said gear radially into and out of meshing engagement with a gear train including said worm gear, the attachment thus permiting the powered PTO shaft to drive mechanism, drive an auxiliary mechanism as a normal PTO unit, and selectively power the transmission at controllable crawling speeds.

References Cited in the file of this patent

UNITED STATES PATENTS

| | | |
|---|---|---|
| 2,661,634 | Beckman et al. | Dec. 8, 1953 |
| 2,776,562 | Watters | Jan. 8, 1957 |
| 2,810,293 | George et al. | Oct. 22, 1957 |
| 2,913,064 | Ferguson et al. | Nov. 17, 1959 |